United States Patent Office 3,519,609
Patented July 7, 1970

3,519,609
METHOD FOR MAKING POLYOLEFIN WAXES BY THERMAL DEGRADATION OF HIGHER MOLECULAR WEIGHT POLYOLEFINS IN THE PRESENCE OF ORGANIC ACIDS AND ANHYDRIDES
Richard L. McConnell and Doyle A. Weemes, Kingsport, Tenn., assignors to Eastman Kodak Company, Rochester, N.Y., a corporation of New Jersey
No Drawing. Filed June 7, 1967, Ser. No. 644,086
Int. Cl. C08f 15/40
U.S. Cl. 260—88.2         14 Claims

ABSTRACT OF THE DISCLOSURE

A process for the production of low viscosity polyolefin waxes by the thermal degradation of high molecular weight polyolefins in the presence of an organic anhydride catalyst. The organic anhydride catalyst can be supplied directly to the polymer to be degraded or can be formed in situ during the degradation by adding to the polymer an organic acid which is converted to an anhydride at the degradation temperatures used in the process. The use of such anhydride catalysts allows a reduction of the degradation temperatures and/or contact times used in the reaction. Reaction temperatures of 200 to 400° C., and preferably 225 to 350° C. are used in the process. Saturated aliphatic or aromatic anhydrides such as acetic anhydride, succinic anhydride, phthalic anhydride, pyromellitic dianhydride, and corresponding acids, such as trimellitic acid and phthalic acid are preferred catalysts.

---

This invention relates to the preparation of low viscosity polyolefin waxes. More particularly, it relates to the preparation of such low viscosity waxes by the catalytic thermal degradation of high molecular weight polyolefins.

Considerable effort has been devoted in the past to the development of low viscosity synthetic waxes that can be substituted for naturally occurring waxes, such as carnauba wax and the like. This work has developed a number of suitable synthetic waxes, particularly low molecular weight, low viscosity polyolefin waxes, such as polyethylene and polypropylene waxes.

One conventional method for producing such polyolefin waxes is by the thermal degradation of high molecular weight solid olefinic polymers. Thus, for example, polypropylene is typically polymerized by catalysis with a metal-containing coordination catalyst to a high molecular weight, crystalline polymer and then converted to the desired wax by thermal degradation. A process for the production of polypropylene waxes by this procedure is shown, for example, in U.S. Pat. 2,835,659.

The threshhold temperature for thermal cracking of polypropylene and other poly-alpha-olefins is about 290° C. In one type of prior art process, for example, the thermal degradation of polyolefins to low molecular weight, low viscosity waxes, it has been necessary to use temperatures above this thermal cracking level to achieve the desired degradation of the polymer. Because the rate of degradation increases as the temperature is raised above 290° C., temperatures substantially in excess of this level have generally been used in prior art commercial processes. For example, U.S. Pat. 2,835,659 teaches the thermal degradation of polypropylene at a temperature of about 300 to 450° C.

Economic considerations also have generally required the use of high temperatures in prior art thermal degradation processes. To produce waxes of desirable molecular weight and viscosity characteristics in economically feasible reaction times, it has generally been necessary to operate at very high temperature levels. For example, higher temperatures are necessary to produce synthetic waxes by thermal degradation of high molecular weight polyethylene than are generally required to degrade polypropylene.

Although prior art thermal degradation processes have achieved a great measure of success, and have produced desirable synthetic waxes, the requirement that very high temperatures be used in the degradation step of these processes has produced a myriad of problems. For example, such high temperatures often produce charring of the polymer being degraded. Over-degradation of the polyolefins to very low molecular weight oils and volatile hydrocarbons is also frequently experienced. In the thermal degradation of polyethylene, for example, problems of polymer cross-linking may be encountered at the highly elevated temperatures used in the degradation step. Such cross-linking is especially troublesome when traces of air are present.

Various attempts have been made to avoid the problems resulting from the use of these high-temperature thermal degradation processes for making synthetic waxes. For example, it has been proposed to use lower temperatures and longer contact or reaction times in the thermal cracking or degradation of the high molecular weight polymers. The use of long contact times, however, not only decreases the economic efficiency of the processes by reducing the production rate of the wax products, but also can cause undesirable discoloration of the final wax products. The prior art therefore has not provided a process that allows a reduction of the temperature at which the degradation is carried out without adversely affecting the reaction time necessary for completion of the degradation process.

Other prior art processes that have been proposed to overcome the foregoing problems have involved the addition of modifying polymers to the high molecular weight olefins to be degraded to modify the properties of the final wax products. The use of these modifying polymers, however, introduced incident problems resulting from the formation of graft or block copolymers between the polyolefins and the modifying polymers.

Accordingly, and in view of the foregoing disadvantages of prior art procedures, it is a primary object of the present invention to provide a new and improved process for the production of polyolefin waxes using relatively low temperatures and short degradation reaction times.

Another object of this invention is to provide an improved process for the production of synthetic polyolefin waxes by the thermal degradation of high molecuar weight olefin polymers at temperatures sufficiently low to avoid charring, cross-linking, or other undesirable side reactions during degradation of the polymers.

Still another object of the present invention is to provide an improved process for the production of low viscosity synthetic polyolefin waxes from high molecular weight olefin polymers by thermal degradation of such high polymers at temperature levels sufficiently low that the degradation rate of the polymer can be controlled to prevent over-degradation of the polymer to low molecular weight oils or volatile hydrocarbons.

Yet another object of this invention is to provide a process for the production of synthetic polyolefin waxes from high molecular weight polyolefins at relatively short contact times, and at temperature levels that help to avoid discoloration of the wax products and provides good production rates at such temperature levels.

A further object of this invention is to provide a catalytic process for the thermal degradation of high molecular weight polyolefins that can be carried out at relatively low temperatures thereby reducing charring, cross-linking, or over-degradation which often occur in high-temperature thermal degradation of polyolefins.

A still further object of this invention is to provide an improved process for the production of synthetic polyolefin waxes by the thermal degradation of high molecular weight solid olefin polymers at a temperature below the threshold temperature of the high molecular weight solid olefin polymers.

Further and additional objects and advantages of the invention will be apparent to those skilled in the art from the detailed disclosure that follows.

The above and other objects of this invention are accomplished by a process for the preparation of low viscosity synthetic polyolefin waves which comprises thermally degrading a high molecular weight solid olefin polymer by heating the polymer at a temperature of from about 200 to 400° C. in the absence of oxygen and in the presence of an organic anhydride catalyst for a time sufficient to thermally degrade the high molecular weight polyolefin to a low viscosity wax. The catalyst can be initially supplied to the reaction vessel as an anhydride, or it can be formed in situ by adding to the reaction mixture an organic compound capable of forming an anhydride at the reaction temperatures used. The process of this invention also allows the preparation of low viscosity synthetic waxes from high molecular weight polyolefins by thermal degradation of the polyolefins at rapid rates and/or at desirably lower temperature levels. The advantageous results of this invention are achieved by carrying out the thermal degradation step in the presence of an organic compound such as an organic anhydride or an organic acid which forms an anhydride at the reaction temperatures used. The improvements derived from the present process not only increase its economy, but also produce wax products that have not been adversely affected by the prior art preparation procedures.

The high molecular weight polymers which are thermally degraded to produce low viscosity polyolefin waxes, in accordance with the present process, can be prepared from any desired polyolefin obtained by conventional polymerization processes for preparing polymeric materials and include homopolymers, copolymers, terpolymers and the like. Such homopolymers include polypropylene, poly-1-butene, poly-1-pentene, poly-1-hexene, poly-1-dodecene, poly-4-methyl-1-pentene, and the like; as well as the copolymers of ethylene and propylene, ethylene and 1-butene, propylene and 1-butene, propylene and 4-methyl-1-pentene, 1-butene and 4-methyl-1-pentene, propylene and 1-hexene, propylene and 1-dodecene, 4-methyl-1-pentene and 1-hexene, and the like. Particularly important synthetic wax products are produced using high molecular weight polymers of propylene, 1-butene, or copolymers or terpolymers of ethylene propylene and 1-butene.

The extent to which these alpha-olefins are polymerized prior to thermal degradation is not critical, and the polyolefin may be of any desired molecular weight. Preferably, however, the thermal degradation is carried out on solid polyolefins having a melt flow of about 0.1 to 100 or even greater (ASTM D1238-57T). The high molecular weight homopolymeric or copolymeric polyolefins can be prepared by conventional polymerization processes for preparing polymeric materials. For example, one such suitable polymer is the highly crystalline polypropylene prepared according to U.S. Pat. 2,969,345.

The high molecular weight solid polyolefin is thermally degraded by heating in the presence of an organic anhydride catalyst. Thermal degradation of the polymer in the presence of the anhydride catalyst has been found to provide an improved process for the thermal degradation of polyolefins. One of the beneficial results attained by the present process is that the catalyst allows the use of the low degradation temperatures and/or short degradation times. The catalytic degradation of the present process is carried out in the melt phase of the polymer at temperatures of from about 200 to 400° C. The thermal degradation is most advantageously carried out at temperatures between about 225 and 350° C. The threshold cracking temperature of polyolefins is about 290° C., and it is preferred in accordance with the present process to degrade the polymer at temperatures at or below this temperature, because such low temperature operation avoids polymer charring, cross-linking, over-degradation, and the like.

In certain instances, it may be desirable to carry out the degradation at temperatures above the threshold cracking temperature of the polyolefin. For example, with certain polyolefins, or polyolefins of certain molecular weight levels, it may be desirable to use higher temperatures to reduce the contact or reaction times necessary to degrade the polymer to the desired wax product. Such high temperature, short contact time procedures are particularly desirable, for example, for use with polymers which have a high tendency to discolor. For these reasons, the present process also contemplates the use of thermal degradation temperatures up to about 400° C.

The thermal degradation of high molecular weight polyolefins to low viscosity waxes is carried out in the substantial absence of oxygen. Thus, air must be substantially excluded from the polymer being degraded. This exclusion can be accomplished in any suitable manner, for example by providing an atmosphere of an inert gas such as nitrogen in the degradation vessel, by carrying out the thermal degradation under vacuum, or by carrying out the degradation in an inert hydrocarbon diluent. Any of these procedures can be used in either batch or continuous operations.

The organic anhydride catalysts used in the present process can be either aliphatic or aromatic anhydrides. The catalyst can be initially supplied to the reaction vessel as an anhydride, or the anhydride catalyst can be formed in situ during the degradation process. This in situ formation is effected by adding to the reaction vessel an aliphatic or aromatic organic acid which forms an anhydride at the degradation temperatures used in the process.

The anhydride catalyst desirably acts as a catalyst by catalyzing the degradation reaction but not entering into the reaction and not becoming attached to the degraded polyolefin. For this reason saturated aliphatic and aromatic organic anhydrides, such as, for example, acetic anhydride, propionic anhydride, butyric anhydride, succinic anhydride, glutaric anhydride, phthalic anhydride, trimellitic anhydride and pyromellitic dianhydride and the like are preferred catalysts for use in the present process. The anhydride can be added to the reaction vessel or can be formed in situ during the reaction by initially charging the reaction vessel with succinic acid, glutaric acid, phthalic acid, trimellitic acid or pyromellitic acid or the like. Each of these acids is capable of forming the corresponding anhydride on being heated to the elevated temperatures used in thermally degrading the solid polyolefins to low viscosity waxes.

Unsaturated anhydrides and their corresponding acids such as maleic anhydride, maleic acid and fumaric acid are also operable in the present process in that they catalyze the thermal degradation of solid polyolefins to waxes at relatively low temperatures and even at temperatures below the threshold cracking temperature of such polyolefins. However, these unsaturated anhydrides and the corresponding acids are not preferred catalysts because they add onto the polymer chain and thereby modify the wax products obtained by the present process. Further, maleic anhydride decomposes at temperatures above about 200° C. and tends to discolor the wax products. Thus, the use of the unsaturated organic anhydrides or acids, and particularly maleic anhydride, should be limited to very low concentrations.

The organic anhydride catalyst is advantageously present during the degradation in an amount between about 0.01 and 10% by weight of the polyolefin, and is preferably present in amounts between about 0.1 and 5% by weight of the polyolefin. One or a combination of two or more anhydrides or acids can be used to supply the necessary amount of catalyst.

As noted hereinbefore, the thermal catalytic degradation process can be carried out either batchwise or in a continuous manner. The reaction or contact period required for this degradation can be varied widely, and depends on the particular degradation temperature used, the polymer being degraded, and the initial molecular weight of the polymer. Reaction times on the order of about 5 minutes or less to about 1 hour or longer can be used, as will be illustrated by the specific examples set forth below. The only requirement of the present process is that the contact period be sufficient to degrade the polyolefin to the desired low viscosity wax.

The high molecular weight polyolefins can be thermally degraded in any suitable equipment, which can be constructed of glass or a suitable metal, such as stainless steel. The thermal degradation can thus be carried out in stirred stainless steel or glass vessel, in stirred multizone reactors, in extruders, in flowing-stream tubular reactors, or in other suitable equipment. If tubular reactors are used, it is often convenient to use a corebuster inside the tube to provide thin layers of polymer.

The polyolefin wax products produced by the process of this invention are low molecular weight, low viscosity waxes having substantially the same properties as the waxes obtained from conventional prior art thermal degradation processes. These products generally have a melt viscosity of from about 100 to 100,000 centipoises at 190° C. as measured by A.S.T.M. Procedure D–1238–57T with orifice size of 0.04± 0.002 inch and a 325 gram weight; densities of about 0.83 to 0.94 as measured in a solvent gradient tube; and saponification numbers of not greater than about 3.0, and preferably of substantially zero.

The low melt viscosity characteristics of these waxes are particularly important, because they make it possible to apply these wax materials directly in the molten state as protective coatings to substrates. The wax products of this invention are also valuable as paraffin additives, as coatings for paper, paperboard and the like, for use as decorative coatings, as slip agents in printing inks, as lubricating aids in rubber compounding, and for melt index control of high molecular weight polyolefin plastics.

Treatment of the low viscosity polyolefin waxes produced by the present process with maleic anhydride provides emulsifiable products with high saponification numbers (15 to 35) which can be used in the treatment of textiles to provide scuff resistance for permanent press fabrics, and in preparing floor polishes having high gloss, high hardness, and good slip resistance.

This invention can be further illustrated by the following examples of preferred embodiments thereof; although it will be understood that these examples are included merely for purposes of illustration and are not intended to limit the scope of the invention unless otherwise specifically indicated. Also, all parts and percentages are by weight unless otherwise specifically indicated.

EXAMPLE 1

Fifty (50) grams of high molecular weight polypropylene (I.V. 2.0) and 3.8 g. of phthalic anhydride are placed in a stainless steel autoclave. The autoclave is purged with dry nitrogen to remove air, heated to 325° C. with rocking, and maintained at that temperature for 30 minutes. After cooling the autoclave to room temperature, the product is removed as a hard, white, crystalline mass. It has a melt viscosity of 180 cps. at 190° C.

The phthalic anhydride catalyst is removed by dissolving the low-viscosity product in xylene and then precipitating the polymer in acetone. The low-viscosity polymer after this treatment has a saponification number of about zero (0), indicating that the phthalic anhydride is not chemically attached to the degraded polypropylene wax. The wax product has a DTA melting point of 165° C.

One method for the determination of saponification number is as follows: Weigh approximately 4 g. of the sample into a 500 ml. alkali-resistant Erlenmeyer flask and add 100 ml. distilled xylene. Heat under a reflux condenser for 1 hour. Cool the solution to 75° C. or less, and add from a buret 30 ml. standardized .10 N KOH in ethyl alcohol. Heat under reflux for 45 min. Cool, and add from a buret standardized .10 N $CH_3COOH$ in xylene until the mixture is acid to phenolphthalein. Add at least 1 ml. excess $CH_3COOH$. Reheat the solution under reflux for 15 min. Remove from heat, add 5 ml. water, and titrate to a faint pink end point with .10 N KOH in ethyl alcohol. Run a blank in this manner using the same amounts of reagents and the same heating times. Calculations:

$$\left[ \frac{\overset{\text{(for sample)}}{[(\text{ml. KOH} \times N) - (\text{ml. CH}_3\text{COOH} \times N)]} - \overset{\text{(for blank)}}{[(\text{ml. KOH} \times N) - (\text{ml. CH}_3\text{COOH} \times N)]}}{\text{g. sample}} \right]$$

$\times 56.1 =$ Saponification No.

EXAMPLE 2

The procedure of Example 1 is repeated except that only 1.0 g. of phthalic anhydride catalyst is used. The results are substantially similar to those obtained in Example 1.

EXAMPLE 3

The procedure of Example 1 is again repeated except that only 0.5 g. of phthalic anhydride catalyst is used. The results obtained are substantially the same as those of Example 1.

EXAMPLE 4

Fifty (50) grams of high molecular weight polypropylene (I.V.=2.0) and 2.5 g. of maleic anhydride are heated in an autoclave at 325° C. for 30 minutes, as described in Example 1. The hard, off-white, crystalline product has a melt viscosity of 10,500 cps. at 190° C. After being dissolved in xylene and precipitated in acetone, the product has a saponification number of 9.6.

EXAMPLE 5

Polypropylene (melt flow=35 at 230° C.) and phthalic anhydride are continuously fed in separate streams into the bottom of a stirred multizone stainless steel reactor. The stirrer is driven at a speed of 1500 r.p.m., and the reactor is operated at 325° C. for a contact time of twenty-five (25) minutes. The amount of phthalic anhydride fed to the reactor is 1% by weight of the polypropylene. The degraded polymer product is removed from the top of the reactor at a rate of 25 lb./hr. and is passed through a thin-film evaporator to remove the anhydride. The product is quenched in a water trough and granulated. It is a hard, white, brittle wax having a melt viscosity of 3,000 cps. at 190° C.

EXAMPLES 6–18

In these examples, various high molecular weight polyolefins are thermally degraded by the general procedure followed in Example 1. The reaction temperatures, reaction times and particular catalysts used in these examples are set forth in Table 1. Table 1 also shows the high molecular weight polyolefin degraded in each example, the initial melt flow of these polymers, and the melt flow or melt viscosity of the polyolefin wax products produced.

TABLE 1

| Ex. No. | Polyolefin degraded | Initial melt flow at 230° C. | Catalyst | Reaction temp. (° C.) | Reaction time (min.) | Product melt flow at 230° C. | Melt vis. (cp.) at 190° C. |
|---|---|---|---|---|---|---|---|
| 6 | Polypropylene | 6.8 | None | 200 | 30 | 9.8 | |
| 7 | do | 6.8 | Maleic anhydride | 200 | 30 | 6.0 | |
| 8 | do | 6.8 | Phthalic anhydride | 200 | 30 | 20.0 | |
| 9 | Poly-1-butene | 2.1 | Succinic anhydride | 350 | 30 | | 5,500 |
| 10 | Poly-1-hexene | 1.5 | do | 350 | 40 | | 6,000 |
| 11 | Poly-4-methyl-1-pentene | 0.5 | Trimellitic acid | 350 | 25 | | 500 |
| 12 | Poly-1-dodecene | 2.4 | Phthalic acid | 350 | 20 | | 8,500 |
| 13 | 95/5 copolymer of propylene and 1-butene | 0.5 | Pyromellitic dianhydride | 330 | 30 | | 300 |
| 14 | 60/40 copolymer of propylene and 1-butene | 20 | Phthalic anhydride | 350 | 10 | | 75,000 |
| 15 | 55/45 copolymers of propylene and 1-butene | 9 | Succinic anhydride | 250 | 90 | | 80,000 |
| 16 | Polypropylene | 27 | Phthalic anhydride | 275 | 60 | | 42,000 |
| 17 | 10/90 copolymer of ethylene and 1-butene | [1] 2.2 | Succinic anhydride | 370 | 50 | | 4,000 |
| 18 | 90/10 copolymer of propylene and 4-methyl-1-pentene | 0.9 | Phthalic anhydride | 325 | 30 | | 1,500 |

[1] Melt index at 190° C.

The invention has been described in considerable detail with particular reference to preferred embodiments thereof, but it will be understood that variations and modifications can be effected within the spirit and scope of the invention as described hereinabove and as defined in the appended claims.

What is claimed is:

1. A process for the preparation of low viscosity synthetic waxes from high molecular weight polyolefins which comprises heating a high molecular weight polyolefin at temperatures between about 200 and 400° C. in the absence of oxygen and in the presence of a catalyst selected from the group consisting of saturated organic anhydrides and organic acids which are converted to saturated organic anhydrides at such temperatures.

2. The process of claim 1, in which the thermal degradation of the high molecular weight polyolefin is carried out at a temperature between about 225 and 350° C.

3. The process of claim 1, in which the thermal degradation of the high molecular weight polyolefin is carried out at a temperature not greater than about 290° C.

4. The process of claim 1, in which the thermal degradation is carried out by heating the high molecular weight polyolefin in an inert atmosphere.

5. The process of claim 1, in which the polyolefin is selected from the group consisting of homopolymers of propylene, 1-butene, 1-hexene, 4-methyl-1-pentene, 1-dodecene, and copolymers of at least two thereof.

6. The process of claim 5, in which the polyolefin is polypropylene.

7. The process of claim 5, in which the polyolefin is poly-1-butene.

8. The process of claim 5, in which the polyolefin is a copolymer of propylene and 1-butene.

9. The process of claim 1, in which the catalyst is a saturated aliphatic anhydride.

10. The process of claim 9, in which the catalyst is succinic anhydride.

11. The process of claim 1, in which the catalyst is an aromatic anhydride.

12. The process of claim 11, in which the catalyst is phthalic anhydride.

13. The process of claim 11 in which the catalyst is pyromellitic dianhydride.

14. The process of claim 1 in which the catalyst is trimellitic acid.

References Cited

FOREIGN PATENTS 1,364,747   6/1964   France.

JOSEPH L. SCHOFER, Primary Examiner

R. S. BENJAMIN, Assistant Examiner

U.S. Cl. X.R.

260—80.78, 93.7